(12) United States Patent
Hesse et al.

(10) Patent No.: US 9,569,869 B2
(45) Date of Patent: Feb. 14, 2017

(54) CONSOLIDATION AND CUSTOMIZATION OF GRAPH-BASED MODELS

(71) Applicants: Stefan Hesse, Dresden (DE); Martin Rosjat, Dresden (DE); Volodymyr Vasyutynskyy, Dresden (DE); Christian Hengstler, Dresden (DE)

(72) Inventors: Stefan Hesse, Dresden (DE); Martin Rosjat, Dresden (DE); Volodymyr Vasyutynskyy, Dresden (DE); Christian Hengstler, Dresden (DE)

(73) Assignee: SAP SE, Walldorf (DE)

( * ) Notice: Subject to any disclaimer, the term of this patent is extended or adjusted under 35 U.S.C. 154(b) by 275 days.

(21) Appl. No.: 14/445,398

(22) Filed: Jul. 29, 2014

(65) Prior Publication Data

US 2016/0035114 A1    Feb. 4, 2016

(51) Int. Cl.
G06Q 10/10 (2012.01)
G06T 11/20 (2006.01)
G06Q 10/00 (2012.01)

(52) U.S. Cl.
CPC ............ G06T 11/206 (2013.01); G06Q 10/00 (2013.01)

(58) Field of Classification Search
None
See application file for complete search history.

(56) References Cited

U.S. PATENT DOCUMENTS

| 7,818,679 B2 * | 10/2010 | Clarke | H04L 67/38 709/201 |
| 2009/0313331 A1 * | 12/2009 | Rasmussen | G06F 17/2288 709/205 |
| 2010/0153090 A1 * | 6/2010 | Chen | G06F 17/2785 704/2 |
| 2012/0101980 A1 * | 4/2012 | Taleghani | G06F 17/2288 707/608 |
| 2012/0311036 A1 * | 12/2012 | Huhn | G06Q 10/10 709/204 |
| 2014/0156633 A1 * | 6/2014 | Duan | G06F 17/30442 707/713 |
| 2014/0372458 A1 * | 12/2014 | Jurca | G06F 17/30958 707/754 |
| 2015/0058316 A1 * | 2/2015 | Bruno | G06F 17/30442 707/718 |
| 2015/0220589 A1 * | 8/2015 | Kummer | G06F 17/30371 707/690 |

* cited by examiner

*Primary Examiner* — David H Chu
(74) *Attorney, Agent, or Firm* — Schwegman Lundberg & Woessner, P.A.

(57) ABSTRACT

Techniques of consolidation and customization of graph-based models are disclosed. A first graph-based representation of a first model can comprise a first set of nodes corresponding to data items of the first model, and a second graph-based representation of a second model can comprise a second set of nodes corresponding to data items of the second model. Matching nodes between the first set of nodes and the second set of nodes can be identified. Matching topological features between the first set of nodes and the second set of nodes can be identified. Matching dependency characteristics between the first set of nodes and the second set of nodes can be identified. A third graph-based representation of a consolidated model can be created based on the matching nodes, the matching topological features, and the matching dependency characteristics.

20 Claims, 9 Drawing Sheets

US 9,569,869 B2

CONSOLIDATION AND CUSTOMIZATION OF GRAPH-BASED MODELS

TECHNICAL FIELD

The present application relates generally to the technical field of data processing, and, in various embodiments, to methods and systems of consolidation and customization of graph-based models created by different actors.

BACKGROUND

Maintaining knowledge and knowledge sharing between employees and partners is a crucial task for companies to stay competitive. One of the means for knowledge sharing is the use of models. However, current solutions lack an efficient way to consolidate and customize models.

BRIEF DESCRIPTION OF THE DRAWINGS

Some embodiments of the present disclosure are illustrated by way of example and not limitation in the figures of the accompanying drawings, in which like reference numbers indicate similar elements, and in which.

DETAILED DESCRIPTION

Figure 1:
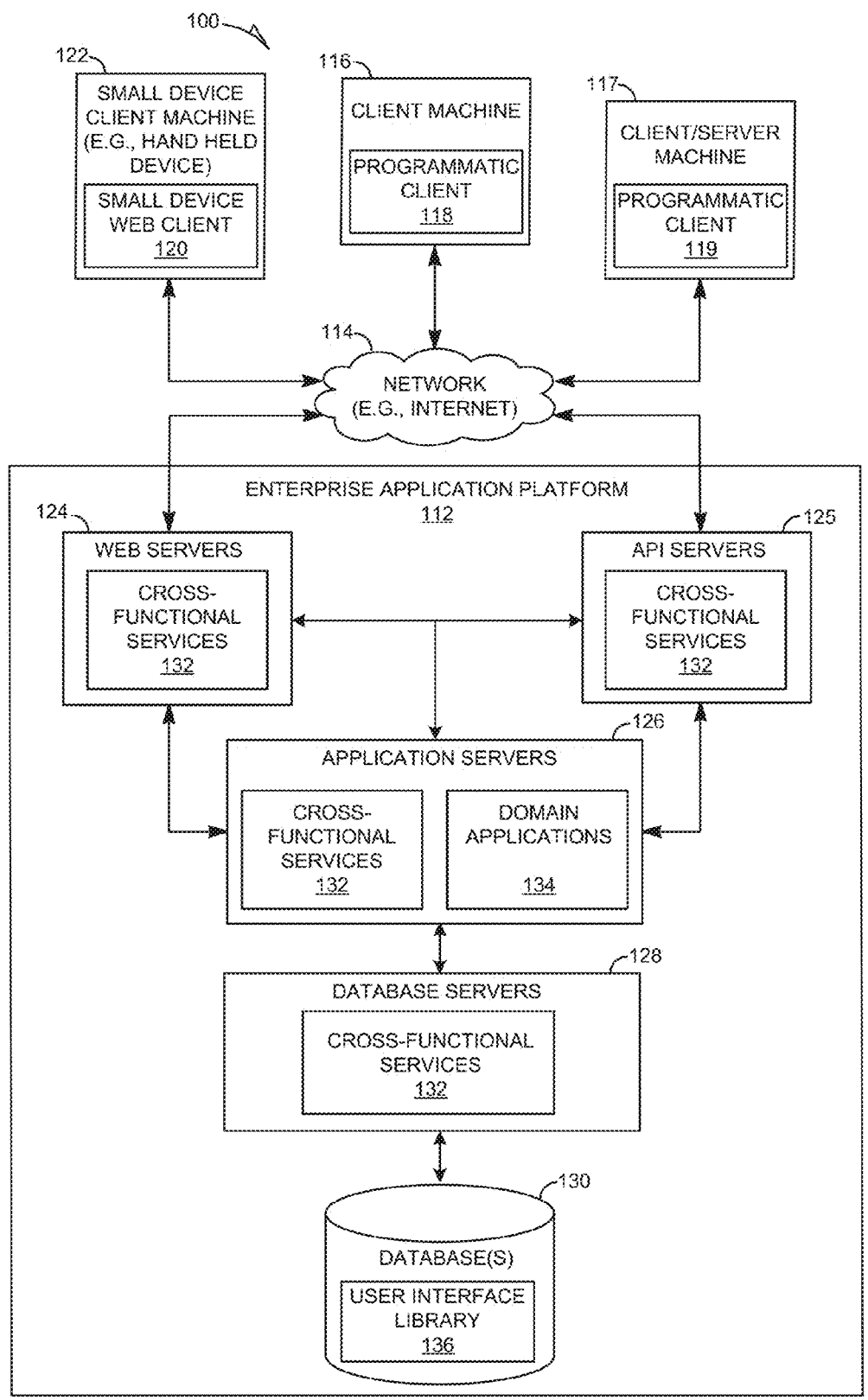
FIG. 1 is a network diagram illustrating a client-server system, in accordance with some example embodiments.

Example methods and systems of consolidation and customization of graph-based models are disclosed. In the following description, for purposes of explanation, numerous specific details are set forth in order to provide a thorough understanding of example embodiments. It will be evident, however, to one skilled in the art that the present embodiments can be practiced without these specific details.

Models can be visualized using a graph-based representation. Graphs can comprise nodes (e.g., proper model entities) and edges (e.g., weighted and directed connections between nodes, expressing, for example, dependencies or influences between nodes). A graph can enable a feasible interpretation of dependencies between data items represented as nodes. They can be used for describing and analysis of complex problems, including, but not limited to, root-cause analysis, key performance indicator (KPI) analysis, what-if simulation, and production networks. The models and their graph-based representations can be produced by different means and actors, including, but not limited to, expert estimations, statistical analysis, fact-based reasoning, structural analysis, and user interaction. Furthermore, one single model sometimes represents only one specific viewpoint of an expert or one area of interest. As result, there can exist different models for the same use case, or models covering parts of a single use case. For solving a certain analytical problem, a user might not be able to work simultaneously with different models, since it is not clear what version of model should be used for analysis. In these situations, the work of different actors can be merged into one valid consolidated model, covering other relevant models. This generally valid consolidated model can be used to create new problem-specific or use case specific models that are appropriate for the current situation. In the course of time, the situation in an enterprise can change, which can lead to an adjustment of the specific models, as well as influence and evolve the consolidated model.

The systems and methods of the present disclosure enable the continuous consolidation and customization of models to keep them up-to date. This disclosure discloses a method and a system architecture to consolidate different models (e.g., with a graph-based visualization) and to derive new models specific for analysis tasks (e.g., user-specific, area-specific, etc.). Specific models can be created for a certain analytical task. Consolidated models can be created based on different specific and consolidated (if already available) models and represent the consolidated knowledge of several experts that increases their validity. At their turn, new specific models can be derived from consolidated models, so that the re-use of models and adjusting of them to the specific analysis needs are supported.

In some embodiments, a first graph-based representation of a first model created by a first user can be accessed. The first graph-based representation can comprise a first set of nodes and connections between the nodes, each node in the first set of nodes corresponding to a data item of the first model. A second graph-based representation of a second model created by a second user can also be accessed. The second graph-based representation can comprise a second set of nodes and connections between the nodes, each node in the second set of nodes corresponding to a data item of the second model. Matching nodes between the first set of nodes and the second set of nodes can be identified. Matching topological features between the first set of nodes and the second set of nodes can be identified. Matching dependency characteristics between the first set of nodes and the second set of nodes can be identified. A third graph-based representation of a consolidated model can be created based on the matching nodes, the matching topological features, and the matching dependency characteristics.

In some embodiments, a conflict between the first graph-based representation of the first model and the second graph-based representation of the second model can be identified, the third graph-based representation of the consolidated model can be caused to be displayed to a resolving user, and the resolving user can be enabled to resolve the conflict by modifying the third graph-based representation of the consolidated model. In some embodiments, the conflict is between at least one topological feature of the first set of nodes and at least one topological feature of the second set of nodes. In some embodiments, the conflict is between at least one dependency characteristic of the first set of nodes and at least one dependency characteristic of the second set of nodes.

In some embodiments, a deriving user can be enabled to derive a fourth graph-based representation of a derivative model from the third graph-based representation of the consolidated model. In some embodiments, enabling the deriving user to derive the fourth graph-based representation comprises enabling the deriving user to add a new node, modify at least one topological feature, and modify at least one dependency characteristic. In some embodiments, the fourth graph-based representation of the derivative model can be merged with the third graph-based representation of the consolidated model to form a fifth graph-based representation of an updated consolidated model.

In some embodiments, identifying matching nodes comprises performing a semantic matching technique. In some embodiments, identifying matching nodes comprises performing a schema matching technique.

In some embodiments, the data items of the first model and the data items of the second model comprise concrete data objects. In some embodiments, the data items of the first model and the data items of the second model comprise abstract semantic concepts.

The methods or embodiments disclosed herein may be implemented as a computer system having one or more modules (e.g., hardware modules or software modules). Such modules may be executed by one or more processors of the computer system. In some embodiments, a non-transitory machine-readable storage device can store a set of instructions that, when executed by at least one processor, causes the at least one processor to perform the operations and method steps discussed within the present disclosure.

FIG. 1 is a network diagram illustrating a client-server system 100, in accordance with an example embodiment. A platform (e.g., machines and software), in the example form of an enterprise application platform 112, provides server-side functionality, via a network 114 (e.g., the Internet) to one or more clients. FIG. 1 illustrates, for example, a client machine 116 with programmatic client 118 (e.g., a browser), a small device client machine 122 with a small device web client 120 (e.g., a browser without a script engine), and a client/server machine 117 with a programmatic client 119.

Turning specifically to the example enterprise application platform 112, web servers 124 and Application Program Interface (API) servers 125 can be coupled to, and provide web and programmatic interfaces to, application servers 126. The application servers 126 can be, in turn, coupled to one or more database servers 128 that facilitate access to one or more databases 130. The cross-functional services 132 can include relational database modules to provide support services for access to the database(s) 130, which includes a user interface library 136. The web servers 124, API servers 125, application servers 126, and database servers 128 can host cross-functional services 132. The application servers 126 can further host domain applications 134.

The cross-functional services 132 provide services to users and processes that utilize the enterprise application platform 112. For instance, the cross-functional services 132 can provide portal services (e.g., web services), database services and connectivity to the domain applications 134 for users that operate the client machine 116, the client/server machine 117 and the small device client machine 122. In addition, the cross-functional services 132 can provide an environment for delivering enhancements to existing applications and for integrating third-party and legacy applications with existing cross-functional services 132 and domain applications 134. Further, while the system 100 shown in FIG. 1 employs a client-server architecture, the embodiments of the present disclosure are of course not limited to such an architecture, and could equally well find application in a distributed, or peer-to-peer, architecture system.

The enterprise application platform 112 can implement partition level operation with concurrent activities. For example, the enterprise application platform 112 can implement a partition level lock, a schema lock mechanism, manage activity logs for concurrent activity, generate and maintain statistics at the partition level, and efficiently build global indexes. The enterprise application platform 112 is described in greater detail below in conjunction with FIG. 2.

Figure 2:
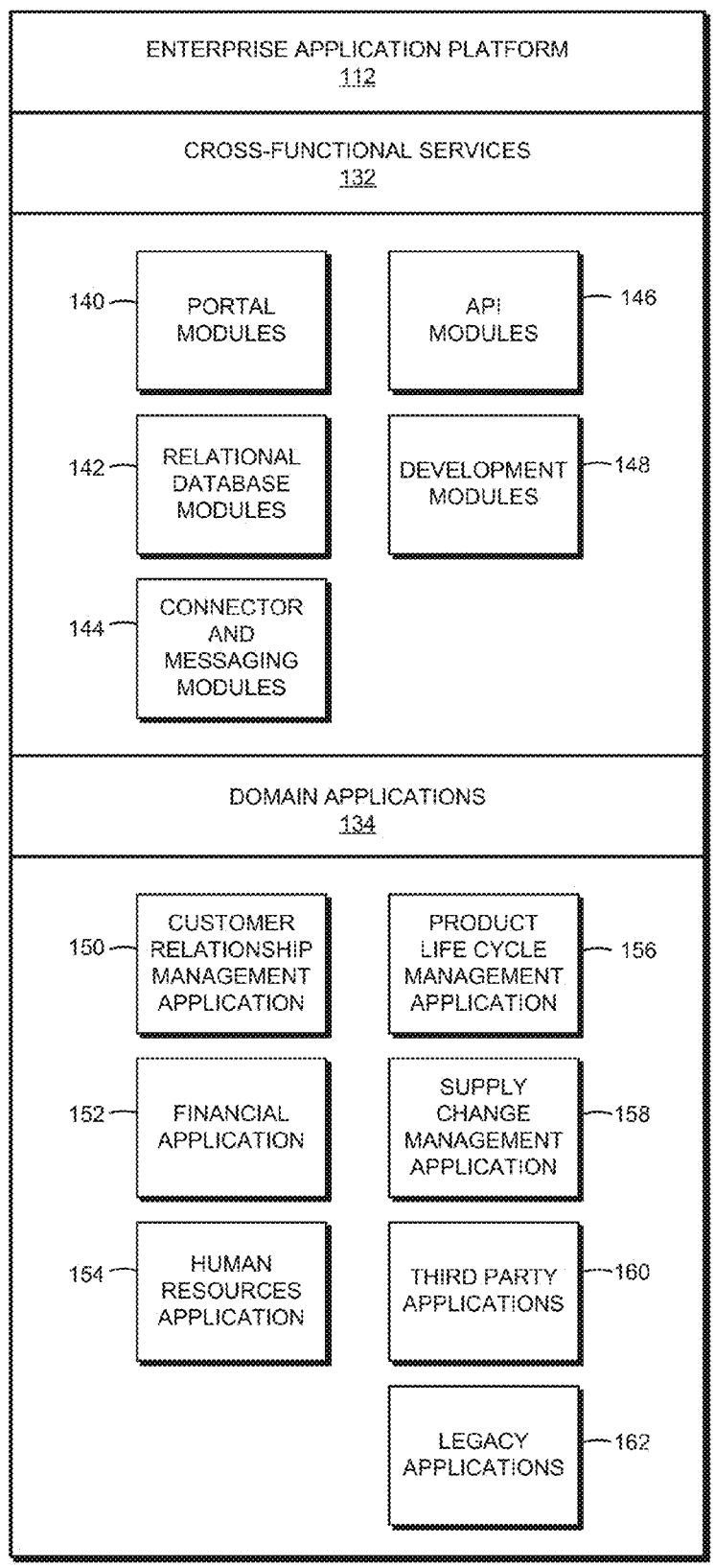
FIG. 2 is a block diagram illustrating enterprise applications and services in an enterprise application platform, in accordance with some example embodiments.

FIG. 2 is a block diagram illustrating enterprise applications and services in an enterprise application platform 112, in accordance with an example embodiment. The enterprise application platform 112 can include cross-functional services 132 and domain applications 134. The cross-functional services 132 can include portal modules 140, relational database modules 142, connector and messaging modules 144, API modules 146, and development modules 148.

The portal modules 140 can enable a single point of access to other cross-functional services 132 and domain applications 134 for the client machine 116, the small device client machine 122, and the client/server machine 117. The portal modules 140 can be utilized to process, author and maintain web pages that present content (e.g., user interface elements and navigational controls) to the user. In addition, the portal modules 140 can enable user roles, a construct that associates a role with a specialized environment that is utilized by a user to execute tasks, utilize services and exchange information with other users and within a defined scope. For example, the role can determine the content that is available to the user and the activities that the user can perform. The portal modules 140 include a generation module, a communication module, a receiving module and a regenerating module. In addition the portal modules 140 can comply with web services standards and/or utilize a variety of Internet technologies including Java, J2EE, SAP's Advanced Business Application Programming Language (ABAP) and Web Dynpro, XML, JCA, JAAS, X.509, LDAP, WSDL, WSRR, SOAP, UDDI and Microsoft .NET.

The relational database modules 142 can provide support services for access to the database(s) 130, which includes a user interface library 136. The relational database modules 142 can provide support for object relational mapping, database independence and distributed computing. The relational database modules 142 can be utilized to add, delete, update and manage database elements. In addition, the relational database modules 142 can comply with database standards and/or utilize a variety of database technologies including SQL, SQLDBC, Oracle, MySQL, Unicode, JDBC, or the like.

The connector and messaging modules 144 can enable communication across different types of messaging systems that are utilized by the cross-functional services 132 and the domain applications 134 by providing a common messaging application processing interface. The connector and messaging modules 144 can enable asynchronous communication on the enterprise application platform 112.

The API modules 146 can enable the development of service-based applications by exposing an interface to existing and new applications as services. Repositories can be included in the platform as a central place to find available services when building applications.

The development modules 148 can provide a development environment for the addition, integration, updating and extension of software components on the enterprise application platform 112 without impacting existing cross-functional services 132 and domain applications 134.

Turning to the domain applications 134, the customer relationship management application 150 can enable access to and can facilitate collecting and storing of relevant personalized information from multiple data sources and business processes. Enterprise personnel that are tasked with developing a buyer into a long-term customer can utilize the customer relationship management applications 150 to provide assistance to the buyer throughout a customer engagement cycle.

Enterprise personnel can utilize the financial applications 152 and business processes to track and control financial transactions within the enterprise application platform 112. The financial applications 152 can facilitate the execution of operational, analytical and collaborative tasks that are associated with financial management. Specifically, the financial applications 152 can enable the performance of tasks related to financial accountability, planning, forecasting, and managing the cost of finance.

The human resource applications 154 can be utilized by enterprise personnel and business processes to manage, deploy, and track enterprise personnel. Specifically, the human resource applications 154 can enable the analysis of human resource issues and facilitate human resource decisions based on real time information.

The product life cycle management applications 156 can enable the management of a product throughout the life cycle of the product. For example, the product life cycle management applications 156 can enable collaborative engineering, custom product development, project management, asset management and quality management among business partners.

The supply chain management applications 158 can enable monitoring of performances that are observed in supply chains. The supply chain management applications 158 can facilitate adherence to production plans and on-time delivery of products and services.

The third-party applications 160, as well as legacy applications 162, can be integrated with domain applications 134 and utilize cross-functional services 132 on the enterprise application platform 112.

Figure 3:
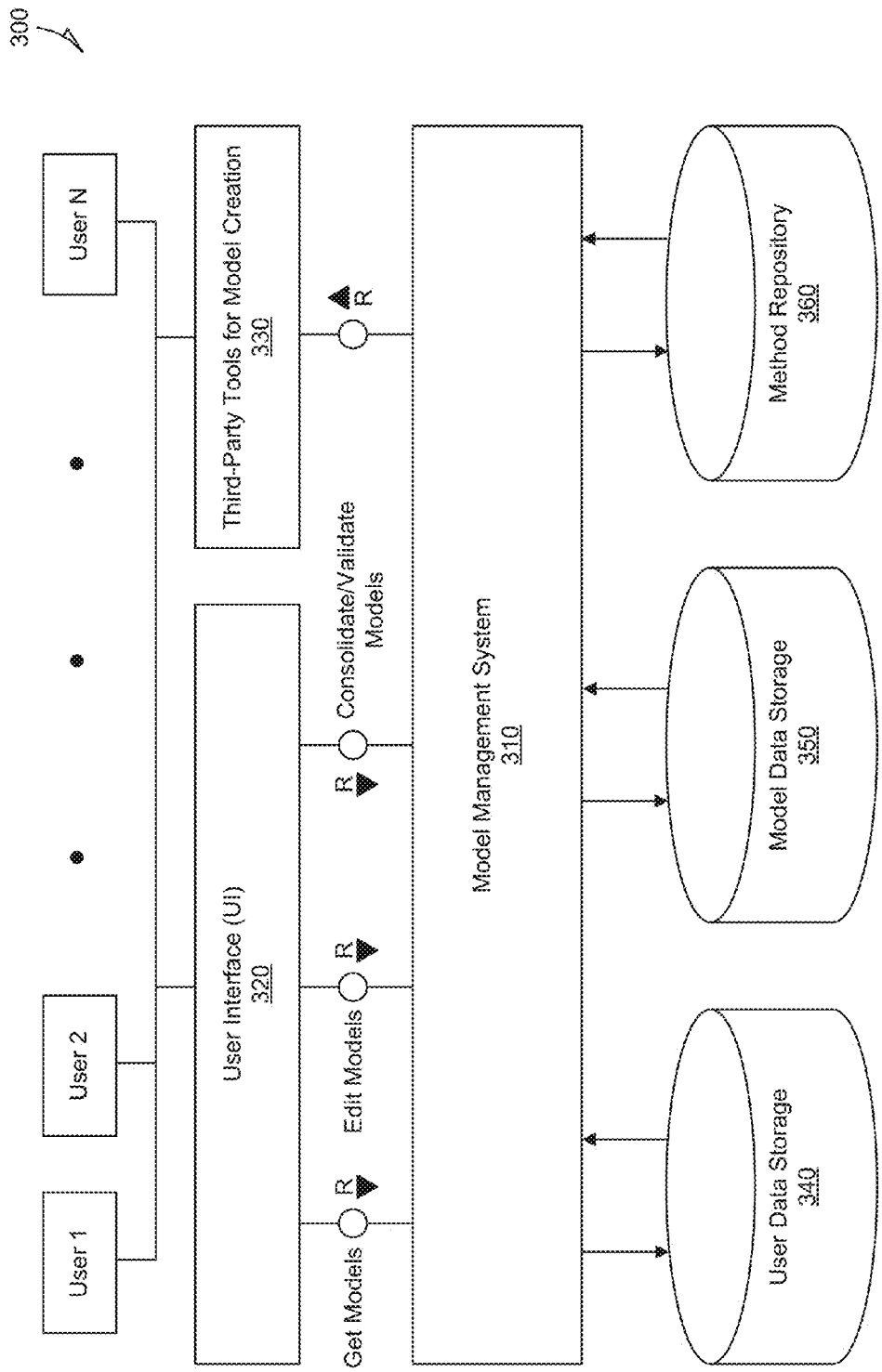
FIG. 3 illustrates a system architecture used in consolidation and customization of models, in accordance with some example embodiments.

FIG. 3 illustrates a system architecture 300 used in consolidation and customization of models, in accordance with some example embodiments. The system architecture 300 can comprise a model management system 310. The model management system 310 can be configured to enable one or more different users (e.g., User 1, User 2, . . . , User N) to request, direct, or otherwise cause, the performance of functions related to models, such as those functions discussed below with respect to FIGS. 4-8. The term "users" can refer to any one of people, organizations, companies, or other entities. The users can access the model management system 310 using machines, such as any one of the client machines 116, 117, and 122 in FIG. 1.

The users can access the model management system 310 via a user interface (UI) 320 integrated or otherwise associated with the model management system 310. The UI 320 can be configured to enable users to create, retrieve, edit, consolidate, validate, view, and analyze models.

User data can be stored in a user data storage 340. The user data storage 340 can comprise one or more databases or other storage mediums. The user data can comprise data relating to and/or affecting each user's use of the model management system 310. Examples of user data include, but are not limited to, user identification information, user login information (e.g., username and password), and user preference information.

Model data can be stored in a model data storage 350. The model data storage 350 can comprise one or more databases or other storage mediums. The model data can comprise specific models and consolidated models. The model data can also comprise graph-based representations of the models.

Different methods of model management (e.g., the methods or operations discussed below with respect to FIGS. 4-8) can be stored in a method repository 360. The method repository 360 can comprise one or more databases or other storage mediums.

The model management system 310 can support the management of different kind of models, as well as the execution of different methods of model management (e.g., consolidation). The model management system 310 can use the user data storage 340, the model data storage 350, and the method repository 360 for persisting and managing specific and consolidated models, as well as for keeping libraries of methods and operations for implementing the features of the present disclosure.

In some embodiments, one or more third party tools 330 can be used for creation of models. The model management system 310 can receive models from the third party tool(s) 330, and the models can then be integrated as specific models into the model data storage 350.

In some embodiments, the model management system 310 can be incorporated into the enterprise application platform 112 in FIG. 1 (e.g., on application server(s) 126). In some embodiments, user data storage 340, model data storage 350, and method repository 360 can be incorporated into database(s) 130 in FIG. 1. However, it is contemplated that other configurations are also within the scope of the present disclosure.

Figure 4:
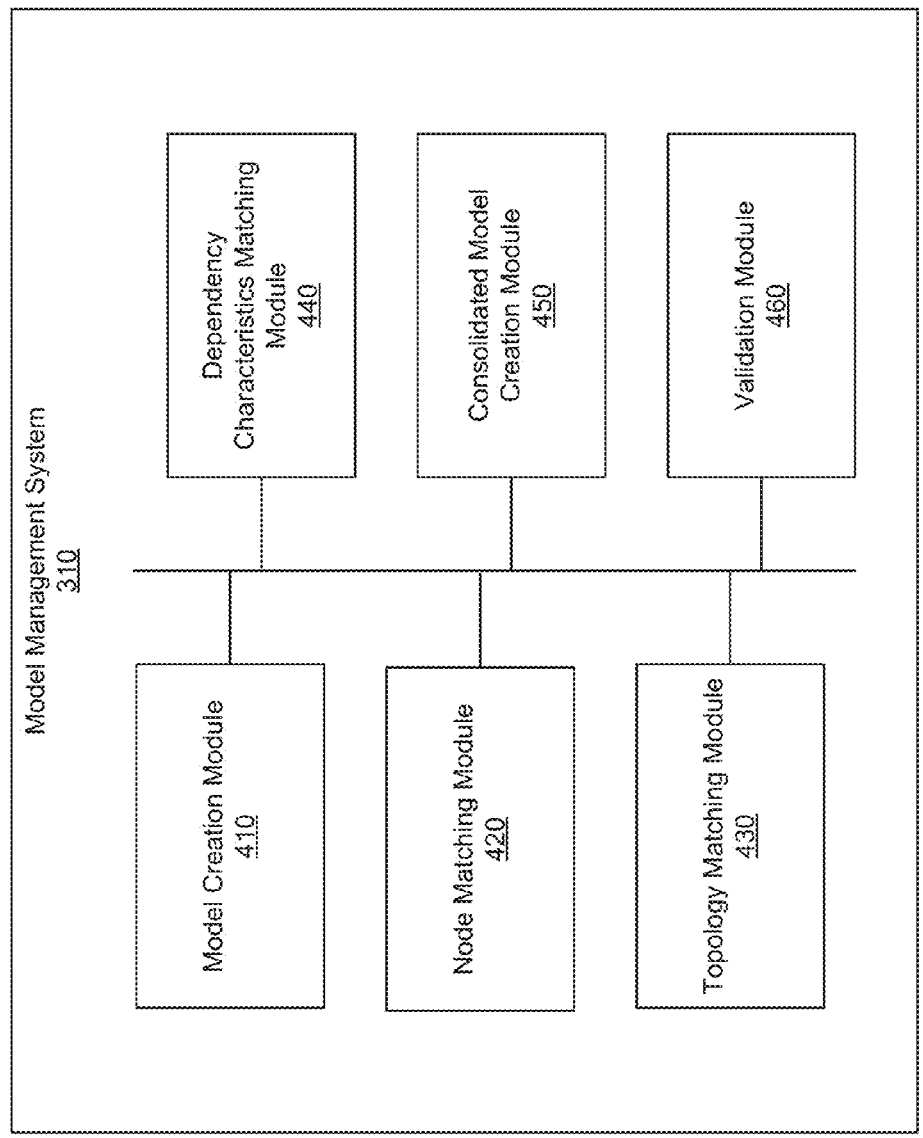
FIG. 4 is a block diagram illustrating components of a model management system, in accordance with some example embodiments.

FIG. 4 is a block diagram illustrating components of the model management system 310, in accordance with some example embodiments. In some embodiments, the model management system 310 can comprise any combination of one or more of a model creation module 410, a node matching module 420, a topology matching module 430, a dependency characteristics matching module 440, a consolidated model creation module 450, and a validation module 460. These modules 410, 420, 430, 440, 450, and 460 can reside on a machine having a memory and at least one processor (not shown). In some embodiments, these modules 410, 420, 430, 440, 450, and 460 can be incorporated into the enterprise application platform 112 in FIG. 1 (e.g., on application server(s) 126). However, it is contemplated that other configurations are also within the scope of the present disclosure.

In some embodiments, the model creation module 410 is configured to create models. The model creation module 410 can also create graph-based representations of the models. Each graph-based representation can comprise a set of nodes and connections between the nodes. Each node can correspond to a data item of the model. It is contemplated that a variety of different methods can be used to create a model. Such methods for model creation can include, but are not limited to, statistical modeling (e.g., using regression models resulting in decision trees), process and production site structure analysis that creates the models based on the structure of the enterprise or site, data structure analysis (e.g., where the models are produced based on the analysis of tables and dependencies between them), and expert estimations (e.g., where human experts define the models based on their experience). Other methods of model creation are also within the scope of the present disclosure. Subsequent to their creation, the models and their corresponding graph-based representations can be accessed.

In some embodiments, the node matching module 420 is configured to identify matching nodes between the nodes of two or more different models. The nodes of the different models can be matched based on the characteristics of the nodes (e.g., position, naming, identification, queries, description, values, etc.) to determine if they represent the same concept or data item and thus can be merged. It is contemplated that a variety of different node matching algorithms can be used to identify the matching nodes. Such node matching algorithms include, but are not limited to, semantic matching (e.g., a general approach to match the semantics of two different nodes or schemas), generic schema matching (e.g., matching of general hierarchies of nominal values), and XML schema matching (e.g., comparing of XML data elements using their names, semantic meaning, structure etc.). Other node matching algorithms are also within the scope of the present disclosure.

In some embodiments, the topology matching module 430 is configured to identify matching topological features between two or more different models. The topology matching module 430 can analyze the level, layers, and hierarchical structure of the matched nodes. The topology matching module 430 can resolve dependencies by their matching and create structural information. For this phase, graph drawing layout algorithms can be applied. Examples of such graph drawing layout algorithms include, but are not limited to, LinLog (described in http://www.informatik.tu-cottbus.de/~an/GD/linlog.html, which is incorporated by reference in its entirety) and Sugiyama's algorithm (described in http://jgaa.info/accepted/2005/EiglspergerSiebenhallerKaufmann2005.9.3.pdf, which is incorporated by reference in its entirety), and graph clustering techniques (e.g., techniques described in "Graph clustering based on structural/attribute similarities", Proc. VLDB Endow., VLDB Endowment, 2009, 2, 718-729, http://dl.acm.org/citation.cfm?id=1687627.1687709). Other methods of matching topological features are also within the scope of the present disclosure. In response to a determination by the topology matching module 430 that dependencies cannot be solved, the nodes (or a sub-model) can be recognized and treated by the topology matching module 430 as a separate branch in the eventual consolidated model.

In some embodiments, the dependency characteristics matching module 440 is configured to identify matching dependency characteristics between two or more different models. It is contemplated that a variety of different algorithms can be used to match dependency characteristics. Different methods for comparing the nominal (e.g., semantic closeness) and numerical values (e.g., weighted averages) can be applied. Depending on the selected method, the automatic merging of dependency characteristics can be made. Different approaches to merging the data like weighted average for numerical data can be used. The weighting coefficients can be chosen depending on actuality of the model, confidence of the expert, and other factors. If the dependencies are not numerical numbers but text, then the weighting based on the semantic closeness can be applied. Other methods of matching dependency characteristics are also within the scope of the present disclosure.

In some embodiments, the consolidated model creation module 450 is configured to create a consolidated model based on the matching nodes, the matching topological features, and the matching dependency characteristics. With the knowledge about matched nodes, detected dependencies, and harmonized or combined dependency characteristics, a consolidated model can created. Criteria of consolidation, which can used by the consolidation algorithms, can be defined by the user. This step can be achieved using an initial consolidated model integrating every further model. In case of conflicts or if nodes cannot be matched, the resolving of conflicts can be done by a user.

In some embodiments, the validation module 460 is configured to validate the consolidated model. The consolidated model or some parts of it can be presented to a user to resolve pending conflicts. The user can be supported in this task using a graph-based representation. In some embodiments, validation of a model can comprise storing the model for later access and use by a user.

Figure 5:
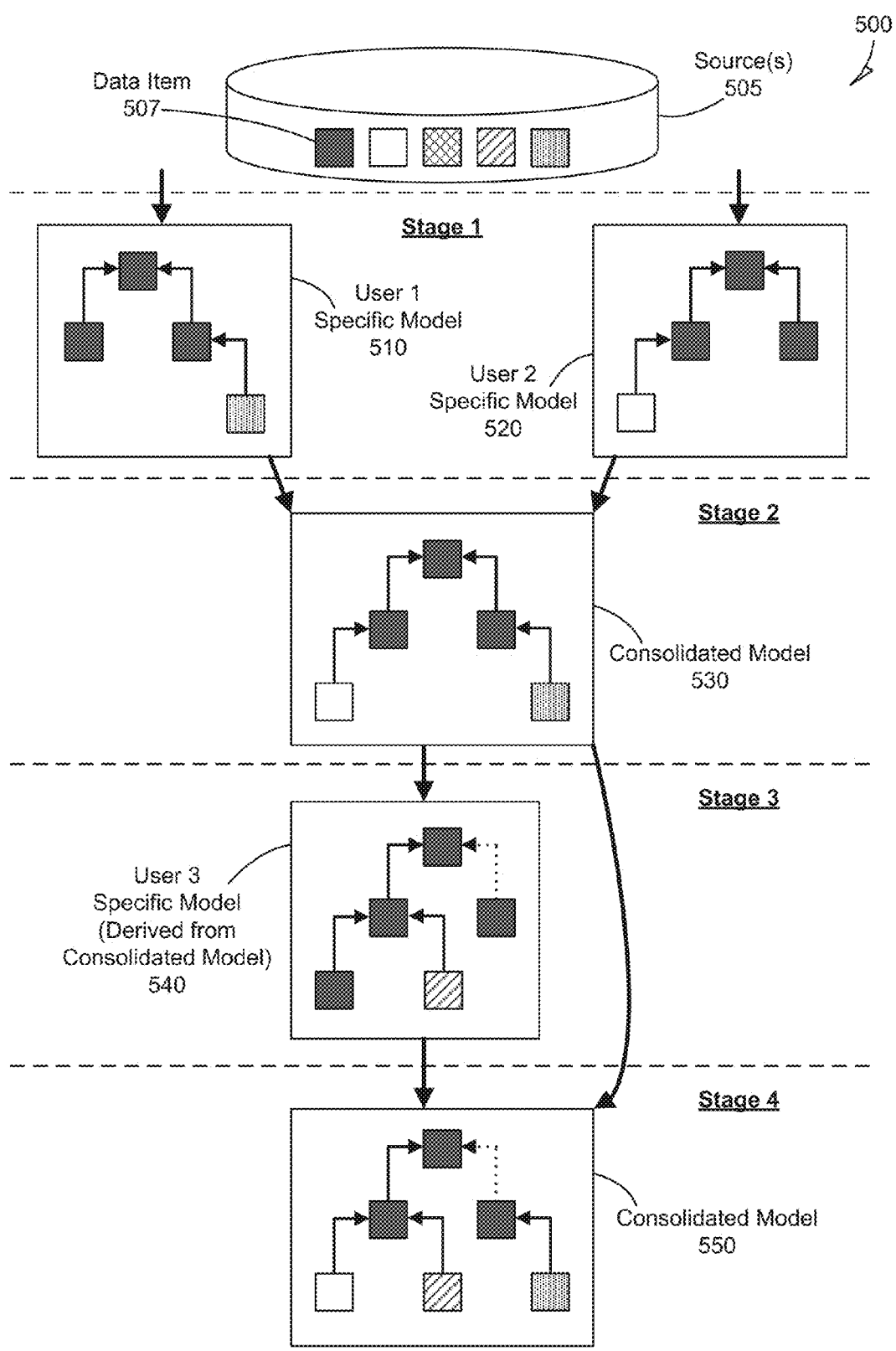
FIG. 5 illustrates a sample workflow of consolidation and customization of models, in accordance with some example embodiments.

FIG. 5 illustrates a sample workflow 500 of consolidation and customization of models, in accordance with some example embodiments. A variety of data items 507 can be provided by one or more sources 505. The data items 507 can be abstract semantic concepts or concrete data objects (e.g., tables in a database). Although FIG. 5 illustrates only one database as source 505, in some embodiments, the workflow considers multiple different data sources 505 as input.

At Stage 1 of the workflow 500, a first user (e.g., User 1) can select data items 507 and build his or her own use case specific model 510 using the selected data items 507. This model 510 comprises nodes, which are the data items form Source(s) 505, and relations between them, represented by the arrows between the nodes. This selection of data items and building of a model can be performed using a GUI 320 or a third party tool 330, and the model 510 can be displayed using a graph-based representation. A second user (e.g., User 2) can also select data items 507 (some could be the same as those selected by User 1, and some could be different from those selected by User 1) from the source(s) 505, and the second user can create another use case specific model 520 (e.g., for a different business unit than the business unit for model 510). This model 520 can be visualized in a graph-based representation. In this manner, multiple users can create multiple models.

For creating the models (e.g., models 510 and 520), manual creation by a user can be sidestepped. For example, statistical modeling (e.g., using regression models) or structural analysis that creates the models based on the structure of the factory (or in the database) can be applied instead of manual creation by a user.

At Stage 2, the created models 510 and 520 can be consolidated to form a consolidated model 530. In order to consolidate the created models 510 and 520 into consolidated model 530, the previously discussed operations of node matching (e.g., as previously discussed with respect to node matching module 420), topology matching (e.g., as previously discussed with respect to topology matching module 430), dependency characteristic matching (e.g., as previously discussed with respect to dependency characteristics matching module 440), and consolidated model creation (e.g., as previously discussed with respect to consolidate model creation module 450) can be performed. These operations can be performed automatically by running the corresponding methods in method execution components. The results of these methods can be validated by a user.

At Stage 3, a third user (e.g., User 3) can derive a specific model 540 from the consolidated model 530 (e.g., as a use case specific derivate model) according to his analysis needs (e.g., logistics data). The specific model 540 can be displayed in a graph form and can optionally be connected to a data source of real data (e.g., a regular database, an enterprise data warehouse, a resource description framework store, or an XML file). In course of analysis, the third user can enrich the model 540 with new data items 507 by creating new nodes or dependencies, updating characteristics, etc. These data items 507 were previously not covered by the consolidated model 530. The third user can also updates some characteristics of a dependency according to the requirements of his use case. His changes to the model can lead to a new graph representation.

At stage 4, the changes of the third user in the derived specific model 540 can be incorporated back into the consolidated model 530 by consolidating specific model 540 and consolidated model 530 into consolidated model 550. This consolidation can update the consolidated model 530 with new information (e.g., local characteristics, use-case specific settings) to a new graph representation shown as consolidated model 550.

Figure 6:
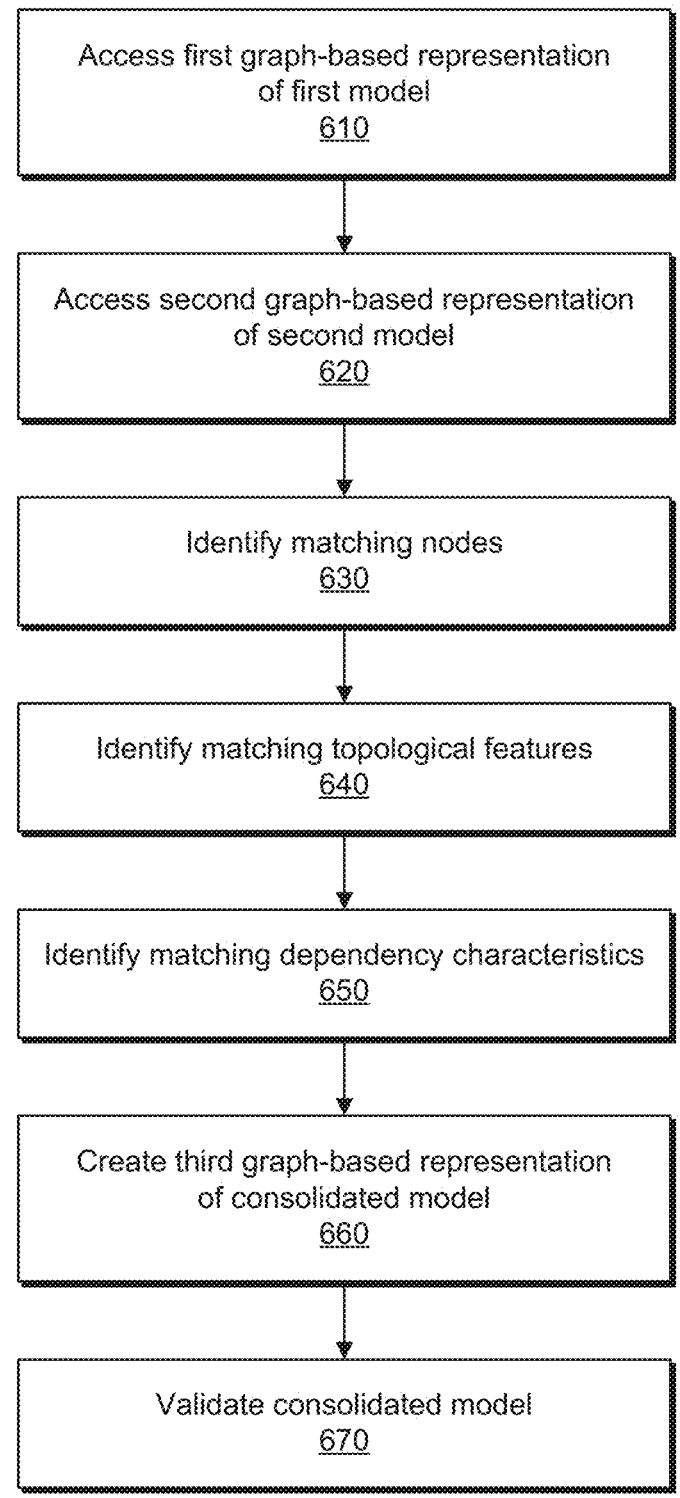
FIG. 6 is a flowchart illustrating a method, in accordance with some example embodiments.

FIG. 6 is a flowchart illustrating a method 600, in accordance with some example embodiments. Method 600 can be performed by processing logic that can comprise hardware (e.g., circuitry, dedicated logic, programmable logic, microcode, etc.), software (e.g., instructions run on a processing device), or a combination thereof. In one implementation, the method 600 is performed by the model management system 310 of FIGS. 3-4, or any combination of one or more of its modules, as described above.

At operation 610, a first graph-based representation of a first model created by a first user can be accessed. The first graph-based representation can comprise a first set of nodes and connections between the nodes, each node in the first set of nodes corresponding to a data item of the first model. At operation 620, a second graph-based representation of a second model created by a second user can be accessed. The second graph-based representation can comprise a second set of nodes and connections between the nodes, each node in the second set of nodes corresponding to a data item of the second model. At operation 630, matching nodes between the first set of nodes and the second set of nodes can be identified, as previously discussed with respect to the node matching module 420. At operation 640, matching topological features between the first set of nodes and the second set of nodes can be identified, as previously discussed with respect to the topology matching module 430. At operation 650, matching dependency characteristics between the first set of nodes and the second set of nodes can be identified, as previously discussed with respect to the dependency characteristics matching module 440. At operation 660, a third graph-based representation of a consolidated model can be created based on the matching nodes, the matching topological features, and the matching dependency characteristics, as previously discussed with respect to the consolidated model creation module 450. At operation 670, the consolidated model can be validated, as previously discussed with respect to the validation module 460.

It is contemplated that any of the other features described within the present disclosure can be incorporated into method 600.

Figure 7:
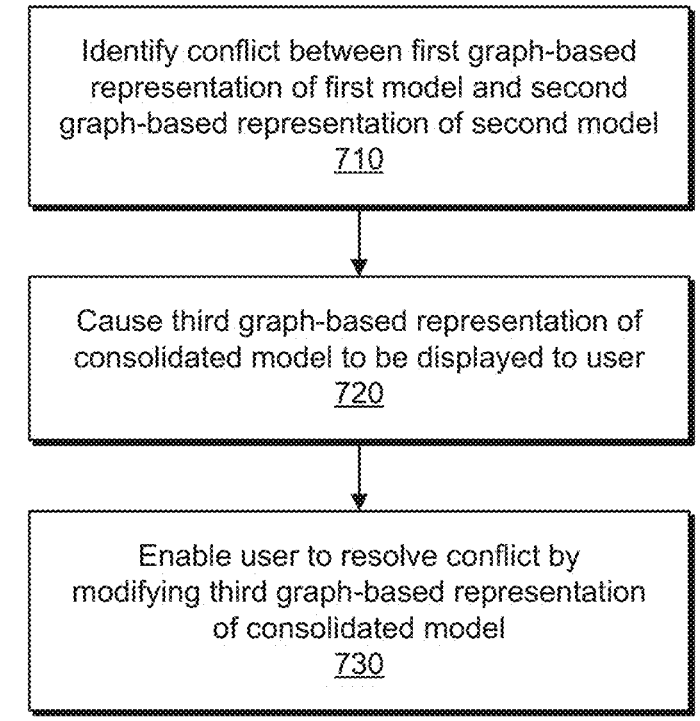
FIG. 7 is a flowchart illustrating a method, in accordance with some example embodiments.

FIG. 7 is a flowchart illustrating a method 700, in accordance with some example embodiments. Method 700 can be performed by processing logic that can comprise hardware (e.g., circuitry, dedicated logic, programmable logic, microcode, etc.), software (e.g., instructions run on a processing device), or a combination thereof. In one implementation, the method 700 is performed by the model management system 310 of FIGS. 3-4, or any combination of one or more of its modules, as described above. In some embodiments, the operations of method 700 can be incorporated into method 600.

At operation 710, a conflict between a first graph-based representation of a first model and a second graph-based representation of a second model can be identified. In some embodiments, the conflict comprises a lack of matching nodes between a first set of nodes of the first model a second set of nodes of the second model. In some embodiments, the conflict is between at least one topological feature of a first set of nodes of the first model and at least one topological feature of a second set of nodes of the second model. In some embodiments, the conflict is between at least one dependency characteristic of a first set of nodes of the first model and at least one dependency characteristic of a second set of nodes of the second model. At operation 720, a third graph-based representation of a consolidated model (e.g., a consolidation of the first model and the second model) can be caused to be displayed to a resolving user. At operation 730, the resolving user can be enabled to resolve the conflict by modifying the third graph-based representation of the consolidated model.

It is contemplated that any of the other features described within the present disclosure can be incorporated into method 700.

Figure 8:
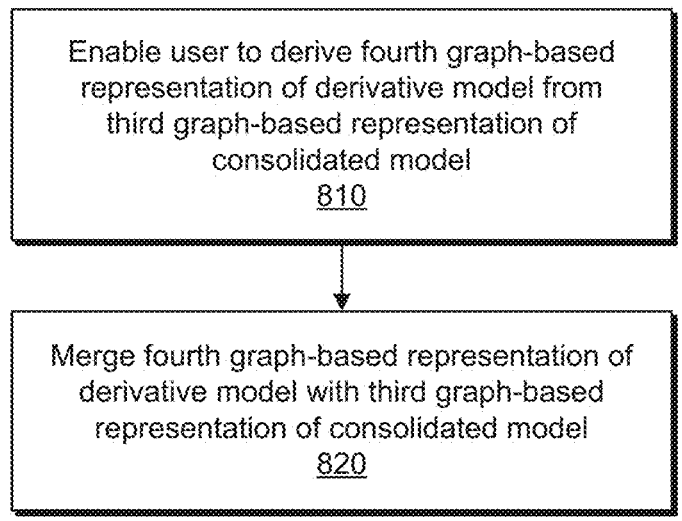
FIG. 8 is a flowchart illustrating a method, in accordance with some example embodiments.

FIG. 8 is a flowchart illustrating a method 800, in accordance with some example embodiments. Method 800 can be performed by processing logic that can comprise hardware (e.g., circuitry, dedicated logic, programmable logic, microcode, etc.), software (e.g., instructions run on a processing device), or a combination thereof. In one implementation, the method 800 is performed by the model management system 310 of FIGS. 3-4, or any combination of one or more of its modules, as described above. In some embodiments, the operations of method 800 can be incorporated into methods 600 and 700.

At operation 810, a deriving user can be enabled to derive a fourth graph-based representation of a derivative model from a third graph-based representation of a consolidated model. In some embodiments, enabling the deriving user to derive the fourth graph-based representation comprises enabling the deriving user to add a new node, modify at least one topological feature, and modify at least one dependency characteristic. At operation 820, the fourth graph-based representation of the derivative model can be merged with the third graph-based representation of the consolidated model to form a fifth graph-based representation of an updated consolidated model.

It is contemplated that any of the other features described within the present disclosure can be incorporated into method 800.

The features of the present disclosure enable the use of a user interface or third party tools for creating models from multiple data sources, as well as using data storage for persisting and managing of specific and consolidated models and for keeping the libraries of methods realizing the operations disclosed herein.

In some embodiments, created models can be consolidated by performing the following steps: a) matching nodes on the basis of their characteristics and merging them if they possess matching concept/data items; b) allowing a user to define criteria of consolidation; c) matching topology of the matched nodes in the model by analyzing their level, layers, and hierarchical structure; d) matching different characteristics of the dependencies; e) creating a consolidated model based on matched nodes, detected dependencies, and combined dependency characteristics; and f) repeating the consolidation process until pending conflicts are resolved by a user using graphical representation of the consolidated model.

The features of the present disclosure also enable a consolidated model to be customized by deriving a specific model from the consolidated model according to user needs, and allowing a user to add nodes and/or dependencies, update characteristics, and perform other modifications to the specific model. The derivative specific model can be integrated back into the consolidated model.

The features disclosed herein provide a fundamental approach to combining multiple specific models into one generic model and vice versa. From a business perspective, the features can be used to create an enterprise-wide model for performance measurement and KPI analysis reflecting the local expertise of local responsible persons (e.g., production managers in a factory of a distributed enterprise). Using such a generic model allows the creation of a valid but specific model, which applies to, for example, new production sites. The combination of distributed models into one generic/consolidated model allows for reflecting the local features, such as dependency characteristics (e.g., weight or influence).

Example Mobile Device

Figure 9:
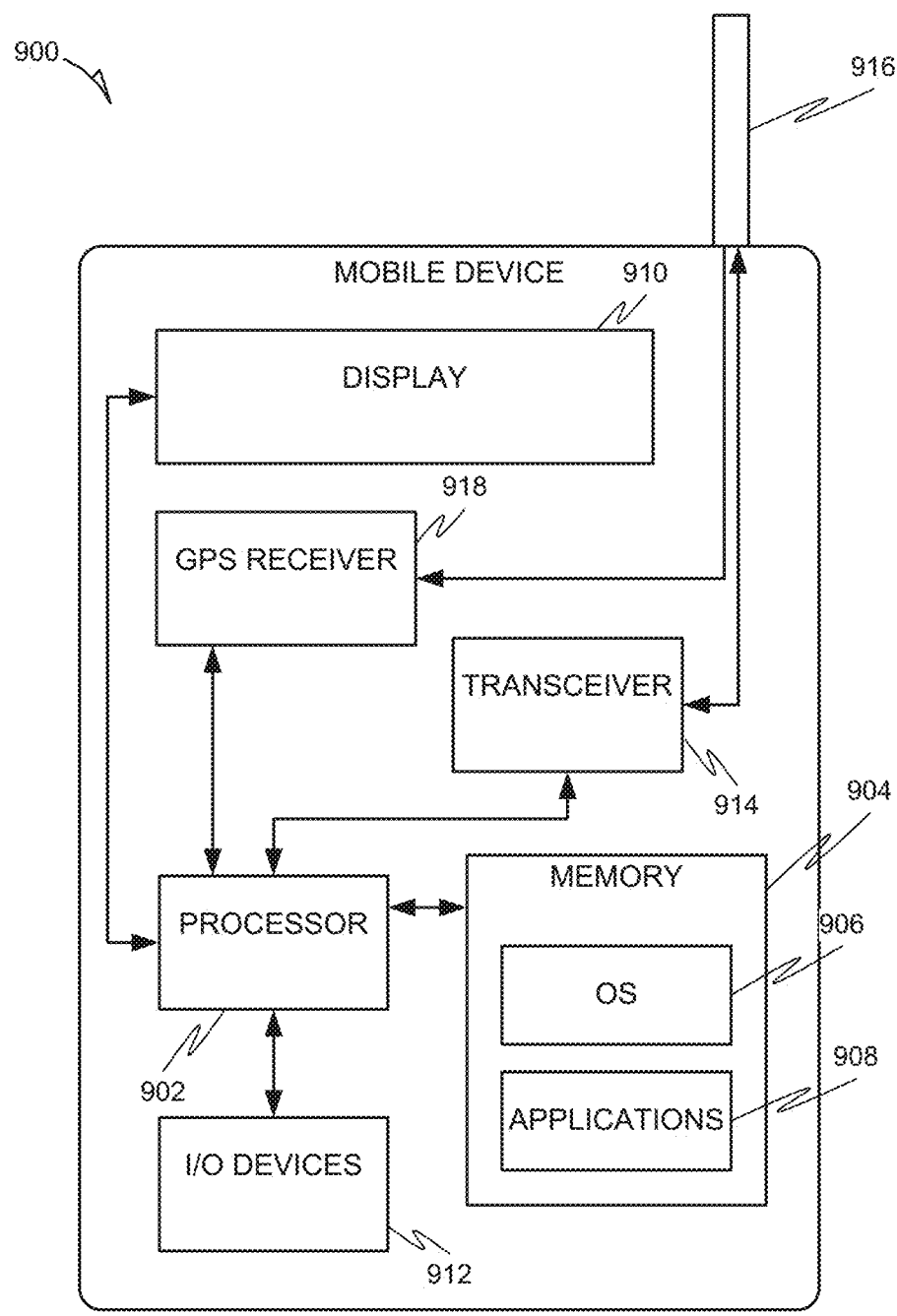
FIG. 9 is a block diagram illustrating a mobile device, in accordance with some example embodiments.

FIG. 9 is a block diagram illustrating a mobile device 900, according to an example embodiment. The mobile device 900 can include a processor 902. The processor 902 can be any of a variety of different types of commercially available processors suitable for mobile devices 900 (for example, an XScale architecture microprocessor, a Microprocessor without Interlocked Pipeline Stages (MIPS) architecture processor, or another type of processor). A memory 904, such as a random access memory (RAM), a Flash memory, or other type of memory, is typically accessible to the processor 902. The memory 904 can be adapted to store an operating system (OS) 906, as well as application programs 908, such as a mobile location enabled application that can provide LBSs to a user. The processor 902 can be coupled, either directly or via appropriate intermediary hardware, to a display 910 and to one or more input/output (I/O) devices 912, such as a keypad, a touch panel sensor, a microphone, and the like. Similarly, in some embodiments, the processor 902 can be coupled to a transceiver 914 that interfaces with an antenna 916. The transceiver 914 can be configured to both transmit and receive cellular network signals, wireless data signals, or other types of signals via the antenna 916, depending on the nature of the mobile device 900. Further, in some configurations, a GPS receiver 918 can also make use of the antenna 916 to receive GPS signals.

Modules, Components and Logic

Certain embodiments are described herein as including logic or a number of components, modules, or mechanisms. Modules can constitute either software modules (e.g., code embodied on a machine-readable medium or in a transmission signal) or hardware modules. A hardware module is a tangible unit capable of performing certain operations and can be configured or arranged in a certain manner. In example embodiments, one or more computer systems (e.g., a standalone, client, or server computer system) or one or more hardware modules of a computer system (e.g., a processor or a group of processors) can be configured by software (e.g., an application or application portion) as a hardware module that operates to perform certain operations as described herein.

In various embodiments, a hardware module can be implemented mechanically or electronically. For example, a hardware module can comprise dedicated circuitry or logic that is permanently configured (e.g., as a special-purpose processor, such as a field programmable gate array (FPGA) or an application-specific integrated circuit (ASIC)) to perform certain operations. A hardware module can also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) can be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor can be configured as respective different hardware modules at different times. Software can accordingly configure a processor, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple of such hardware modules exist contemporaneously, communications can be achieved through signal transmission (e.g., over appropriate circuits and buses) that connect the hardware modules. In embodiments in which multiple hardware modules are configured or instantiated at different times, communications between such hardware modules can be achieved, for example, through the storage and retrieval of information in memory structures to which the multiple hardware modules have access. For example, one hardware module can perform an operation and store the output of that operation in a memory device to which it is communicatively coupled. A further hardware module can then, at a later time, access the memory device to retrieve and process the stored output. Hardware modules can also initiate communications with input or output devices and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors can constitute processor-implemented modules that operate to perform one or more operations or functions. The modules referred to herein can, in some example embodiments, comprise processor-implemented modules.

Similarly, the methods described herein can be at least partially processor-implemented. For example, at least some of the operations of a method can be performed by one or more processors or processor-implemented modules. The performance of certain of the operations can be distributed among the one or more processors, not only residing within a single machine, but deployed across a number of machines. In some example embodiments, the processor or processors can be located in a single location (e.g., within a home environment, an office environment or as a server farm), while in other embodiments the processors can be distributed across a number of locations.

The one or more processors can also operate to support performance of the relevant operations in a "cloud computing" environment or as a "software as a service" (SaaS). For example, at least some of the operations can be performed by a group of computers (as examples of machines including processors), these operations being accessible via a network (e.g., the network 114 of FIG. 1) and via one or more appropriate interfaces (e.g., APIs).

Example embodiments can be implemented in digital electronic circuitry, or in computer hardware, firmware, software, or in combinations of them. Example embodiments can be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations can be performed by one or more programmable processors executing a computer program to perform functions by operating on input data and generating output. Method operations can also be performed by, and apparatus of example embodiments can be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware can be a design choice. Below are set out hardware (e.g., machine) and software architectures that can be deployed, in various example embodiments.

Figure 10:
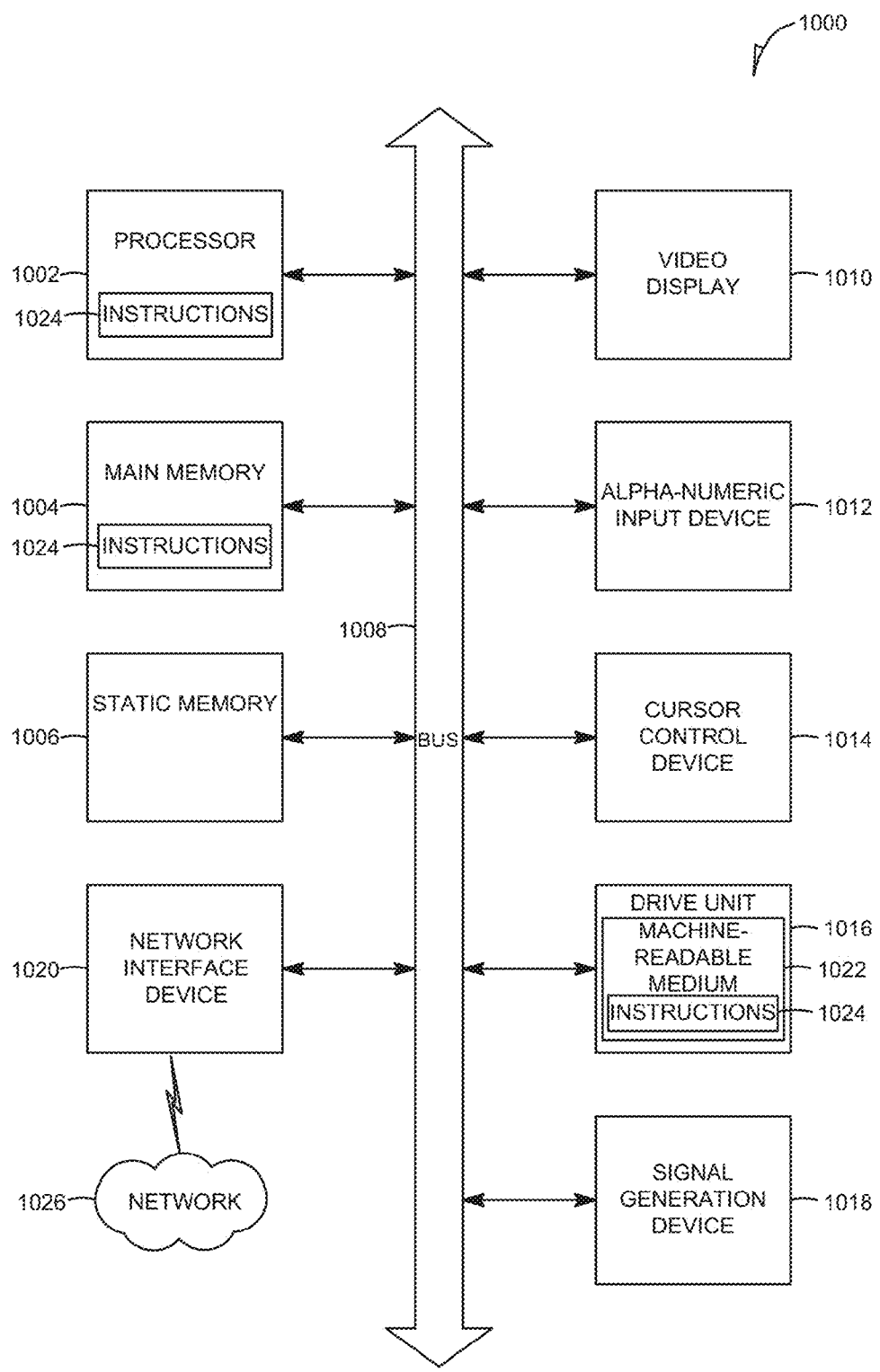
FIG. 10 is a block diagram of an example computer system on which methodologies described herein can be executed, in accordance with some example embodiments.

FIG. 10 is a block diagram of a machine in the example form of a computer system 1000 within which instructions 1024 for causing the machine to perform any one or more of the methodologies discussed herein can be executed, in accordance with an example embodiment. In alternative embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU) or both), a main memory 1004 and a static memory 1006, which communicate with each other via a bus 1008. The computer system 1000 can further include a video display unit 1010 (e.g., a liquid crystal display (LCD) or a cathode ray tube (CRT)). The computer system 1000 also includes an alphanumeric input device 1012 (e.g., a keyboard), a user interface (UI) navigation (or cursor control) device 1014 (e.g., a mouse), a disk drive unit 1016, a signal generation device 1018 (e.g., a speaker) and a network interface device 1020.

The disk drive unit 1016 includes a machine-readable medium 1022 on which is stored one or more sets of data structures and instructions 1024 (e.g., software) embodying or utilized by any one or more of the methodologies or functions described herein. The instructions 1024 can also reside, completely or at least partially, within the main memory 1004 and/or within the processor 1002 during execution thereof by the computer system 1000, the main memory 1004 and the processor 1002 also constituting machine-readable media. The instructions 1024 can also reside, completely or at least partially, within the static memory 1006.

While the machine-readable medium 1022 is shown in an example embodiment to be a single medium, the term "machine-readable medium" can include a single medium or multiple media (e.g., a centralized or distributed database, and/or associated caches and servers) that store the one or more instructions 1024 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 1024 can further be transmitted or received over a communications network 1026 using a transmission medium. The instructions 1024 can be transmitted using the network interface device 1020 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions for execution by the machine, and includes digital or analog communications signals or other intangible media to facilitate communication of such software.

Although an embodiment has been described with reference to specific example embodiments, it will be evident that various modifications and changes can be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter can be practiced. The embodiments illustrated are described in sufficient detail to enable those skilled in the art to practice the teachings disclosed herein. Other embodiments can be utilized and derived therefrom, such that structural and logical substitutions and changes can be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose can be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented method comprising:
  accessing a first graph-based representation of a first model created by a first user, the first graph-based representation comprising a first set of nodes and connections between the nodes, each node in the first set of nodes corresponding to a data item of the first model;
  accessing a second graph-based representation of a second model created by a second user, the second graph-based representation comprising a second set of nodes and connections between the nodes, each node in the second set of nodes corresponding to a data item of the second model;
  identifying matching nodes between the first set of nodes and the second set of nodes;
  identifying matching topological features between the first set of nodes and the second set of nodes;
  identifying matching dependency characteristics between the first set of nodes and the second set of nodes;
  creating, by a machine having a memory and at least one processor, a third graph-based representation of a consolidated model based on the matching nodes, the matching topological features, and the matching dependency characteristics;
  identifying a conflict between the first graph-based representation of the first model and the second graph-based representation of the second model;
  causing the third graph-based representation of the consolidated model to be displayed to a resolving user based on the identifying the conflict; and
  enabling the resolving user to resolve the conflict by modifying the third graph-based representation of the consolidated model using the displayed third graph-based representation of the consolidated model.

2. The method of claim 1, wherein the conflict is between at least one topological feature of the first set of nodes and at least one topological feature of the second set of nodes.

3. The method of claim 1, wherein the conflict is between at least one dependency characteristic of the first set of nodes and at least one dependency characteristic of the second set of nodes.

4. The method of claim 1, further comprising enabling a deriving user to derive a fourth graph-based representation of a derivative model from the third graph-based representation of the consolidated model.

5. The method of claim 4, wherein enabling the deriving user to derive the fourth graph-based representation comprises enabling the deriving user to add a new node, modify at least one topological feature, and modify at least one dependency characteristic.

6. The method of claim 4, further comprising merging the fourth graph-based representation of the derivative model with the third graph-based representation of the consolidated model to form a fifth graph-based representation of an updated consolidated model.

7. The method of claim 1, wherein identifying matching nodes comprises performing a semantic matching technique or a schema matching technique.

8. The method of claim 1, wherein the data items of the first model and the data items of the second model comprise concrete data objects.

9. The method of claim 1, wherein the data items of the first model and the data items of the second model comprise abstract semantic concepts.

10. The method of claim 1, further comprising enabling the resolving user to define criteria of consolidation, wherein the creating of the third graph-based representation of the consolidated model is further based on the criteria of consolidation.

11. A system comprising:
  a machine having a memory and at least one processor; and
  at least one module on the machine, the at least one module being configured to:
    access a first graph-based representation of a first model created by a first user, the first graph-based representation comprising a first set of nodes and connections between the nodes, each node in the first set of nodes corresponding to a data item of the first model;
    access a second graph-based representation of a second model created by a second user, the second graph-based representation comprising a second set of nodes and connections between the nodes, each node in the second set of nodes corresponding to a data item of the second model;
    identify matching nodes between the first set of nodes and the second set of nodes;
    identify matching topological features between the first set of nodes and the second set of nodes;
    identify matching dependency characteristics between the first set of nodes and the second set of nodes;
    create a third graph-based representation of a consolidated model based on the matching nodes, the matching topological features, and the matching dependency characteristics;
    identify a conflict between the first graph-based representation of the first model and the second graph-based representation of the second model;

cause the third graph-based representation of the consolidated model to be displayed to a resolving user based on the identifying the conflict; and enable the resolving user to resolve the conflict by modifying the third graph-based representation of the consolidated model using the displayed third graph-based representation of the consolidated model.

12. The system of claim 11, wherein the conflict is between at least one topological feature of the first set of nodes and at least one topological feature of the second set of nodes or the conflict is between at least one dependency characteristic of the first set of nodes and at least one dependency characteristic of the second set of nodes.

13. The system of claim 11, wherein the at least one module is further configured to enable a deriving user to derive a fourth graph-based representation of a derivative model from the third graph-based representation of the consolidated model.

14. The system of claim 13, wherein the at least one module is further configured to enable the deriving user to add a new node, modify at least one topological feature, and modify at least one dependency characteristic.

15. The system of claim 13, wherein the at least one module is further configured to merge the fourth graph-based representation of the derivative model with the third graph-based representation of the consolidated model to form a fifth graph-based representation of an updated consolidated model.

16. The system of claim 11, wherein the at least one module is further configured to identify matching nodes by performing a semantic matching technique or a schema matching technique.

17. The system of claim 11, wherein the data items of the first model and the data items of the second model comprise concrete data objects or abstract semantic concepts.

18. The system of claim 11, wherein the at least one module is further configured to enable the resolving user to define criteria of consolidation, wherein the creating of the third graph-based representation of the consolidated model is further based on the criteria of consolidation.

19. A non-transitory machine-readable storage medium, tangibly embodying a set of instructions that, when executed by at least one processor, causes the at least one processor to perform a set of operations comprising:

accessing a first graph-based representation of a first model created by a first user, the first graph-based representation comprising a first set of nodes and connections between the nodes, each node in the first set of nodes corresponding to a data item of the first model;

accessing a second graph-based representation of a second model created by a second user, the second graph-based representation comprising a second set of nodes and connections between the nodes, each node in the second set of nodes corresponding to a data item of the second model;

identifying matching nodes between the first set of nodes and the second set of nodes;

identifying matching topological features between the first set of nodes and the second set of nodes;

identifying matching dependency characteristics between the first set of nodes and the second set of nodes;

creating a third graph-based representation of a consolidated model based on the matching nodes, the matching topological features, and the matching dependency characteristics;

identifying a conflict between the first graph-based representation of the first model and the second graph-based re representation of the second model;

causing the third graph-based representation of the consolidated model to be displayed to a resolving user based on the identifying the conflict; and enabling the resolving user to resolve the conflict by modifying the third graph-based representation of the consolidated model using the displayed third graph-based representation of the consolidated model.

20. The non-transitory machine-readable storage medium of claim 19, wherein the set of operations further comprises enabling the resolving user to define criteria of consolidation, wherein the creating of the third graph-based representation of the consolidated model is further based on the criteria of consolidation.

* * * * *